(12) United States Patent
Xu

(10) Patent No.: US 9,065,331 B2
(45) Date of Patent: Jun. 23, 2015

(54) INDUCTOR CURRENT DETECTION CIRCUIT AND LED DRIVER

(71) Applicant: Silergy Semiconductor Technology (Hangzhou) LTD, Hangzhou, ZheJiang Province (CN)

(72) Inventor: Xiaoru Xu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 266 days.

(21) Appl. No.: 13/901,788

(22) Filed: May 24, 2013

(65) Prior Publication Data

US 2014/0009080 A1 Jan. 9, 2014

(30) Foreign Application Priority Data

Jul. 5, 2012 (CN) .......................... 2012 1 0233135

(51) Int. Cl.
*H02M 7/12* (2006.01)
*H05B 33/08* (2006.01)
*H02M 1/00* (2007.01)

(52) U.S. Cl.
CPC ............ *H02M 7/12* (2013.01); *H05B 33/0806* (2013.01); *H02M 2001/0009* (2013.01); *H05B 33/0815* (2013.01); *Y02B 20/347* (2013.01)

(58) Field of Classification Search
USPC .......................... 315/224, 209 R, 212; 363/89
See application file for complete search history.

(56) References Cited

U.S. PATENT DOCUMENTS

| 4,706,009 A * | 11/1987 | Schwarz ........................ 320/138 |
| 7,262,977 B2 * | 8/2007 | Kyono ........................ 363/21.06 |
| 7,385,832 B2 * | 6/2008 | Allinder ....................... 363/21.14 |

* cited by examiner

*Primary Examiner* — Dinh Le
(74) *Attorney, Agent, or Firm* — Michael C. Stephens, Jr.

(57) ABSTRACT

The present invention pertains to an inductor current detection circuit in a switching mode power supply, and a light-emitting diode (LED) driver thereof. In one embodiment, an inductor current detection circuit configured in a switching mode power supply under discontinuous conduction mode, can include: (i) a voltage detection circuit configured to generate a sampling voltage based on a drain-source voltage of a power switch in the switching mode power supply; (ii) a voltage holding circuit configured to receive the sampling voltage, and to generate a holding voltage through a sampling and holding operation; and (iii) a comparison circuit configured to compare the sampling voltage against the holding voltage, and to generate a zero-crossing signal when the sampling voltage is less than the holding voltage, where the zero-crossing signal is configured to represent an inductor current ending time of the switching mode power supply.

10 Claims, 8 Drawing Sheets

INDUCTOR CURRENT DETECTION CIRCUIT AND LED DRIVER

RELATED APPLICATIONS

This application claims the benefit of Chinese Patent Application No. 201210233135.3, filed on Jul. 5, 2012, which is incorporated herein by reference in its entirety.

FIELD OF THE INVENTION

The present invention pertains to the field of electronics, and specifically to an inductor current detection circuit, and a light-emitting diode (LED) driver.

BACKGROUND

With continuous innovation and rapid development in the lighting industry, and an increased importance of energy-saving and environmental protection, light-emitting diode (LED) lighting is quickly developing as a revolutionary energy-saving lighting technology. However, LED is more sensitive to current than voltage due to its volt-ampere and temperature characteristics, so LED may not be directly powered by traditional power supplies. Therefore, such power supply may need to be addressed prior to utilizing LED as a lighting source. Although traditional LED drivers can regulate the luminance of an LED, power factor correction may not be achieved. In addition, an input power factor may be relatively low, with increased harmonic components.

SUMMARY

In one embodiment, an inductor current detection circuit configured in a switching mode power supply under discontinuous conduction mode, can include: (i) a voltage detection circuit configured to generate a sampling voltage based on a drain-source voltage of a power switch in the switching mode power supply; (ii) a voltage holding circuit configured to receive the sampling voltage, and to generate a holding voltage through a sampling and holding operation; and (iii) a comparison circuit configured to compare the sampling voltage against the holding voltage, and to generate a zero-crossing signal when the sampling voltage is less than the holding voltage, where the zero-crossing signal is configured to represent an inductor current ending time of the switching mode power supply.

In one embodiment, a light-emitting diode (LED) driver can include: (i) an inductor current detection circuit; (ii) a control circuit configured to receive the zero-crossing signal, and to generate a control signal configured to control a switching operation of the power switch; (iii) where the control signal is configured to control the power switch to turn on in a switching period after a delay time of the zero-crossing signal; and (iv) where the control signal is configured to control the power switch to turn off after a conduction time interval after the power switch is turned on, where the conduction time interval is proportional to an error between a present output current of the LED driver and an expected output current.

Embodiments of the present invention can advantageously provide several advantages over conventional approaches. For example, particular embodiments can provide an inductor current detection circuit for a switching mode power supply that can precisely obtain output current information, and an LED driver with high efficiency and a high power factor. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
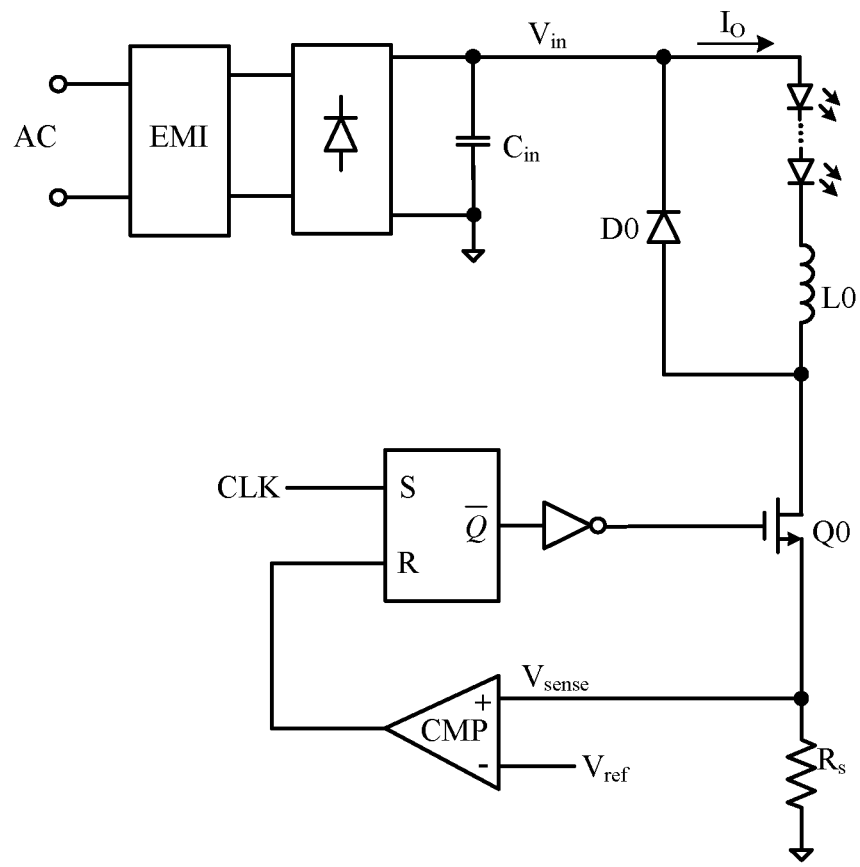
FIG. 1 shows a schematic diagram of an example LED driver.

FIG. 1 shows a schematic diagram of an example light-emitting diode (LED) driver. An AC input power supply can be rectified and filtered through an EMI anti-electromagnetic interference circuit, a rectifier circuit, and filter capacitor $C_{in}$, to generate DC input voltage $V_{in}$. A power stage circuit can include power switch $Q_0$, diode $D_0$, and inductor $L_0$ to receive DC input voltage $V_{in}$, and to generate substantially constant output current $I_o$ to drive an LED load. A control circuit can include a current sampling circuit, comparator CMP, and an RS flip-flop.

The current sampling circuit can connect with power switch Q0 to obtain sampling voltage $V_{sense}$, and then sampling voltage $V_{sense}$ can be compared against reference value $V_{ref}$. The comparison result can be input to the reset terminal of the RS flip-flop, and the set terminal of the RS flip-flop can receive fixed frequency clock signal CLK. In each switching period, clock signal CLK can set the RS flip-flop to control power switch Q0 to turn on. After a predetermined period, when sampling voltage $V_{sense}$ is greater than reference value $V_{ref}$, the RS flip-flop is reset to control power switch Q0 to turn off. By repeating this operation, power switch Q0 can be turned on or off periodically according to clock signal CLK and sampling voltage $V_{sense}$, so that output current $I_o$ can be maintained as substantially constant to drive the LED load.

The example LED driver shown in FIG. 1 can provide a substantially constant current for the LED load. However, this approach may have some drawbacks, including difficulty in achieving "power factor correction." In AC circuits, loads that have capacitance or inductance may produce electrical current that is not in phase with the applied voltage. The phase shift can reduce an amount of the applied power that is usable in the circuit by a fraction known as the power factor. By adding other components to the circuit, the power factor can be restored to a normal value, and this may reduce or eliminate the adverse effect of the phase shift. If power factor correction cannot be achieved, a relatively low input power factor and relatively high harmonic components may result.

Figure 2:
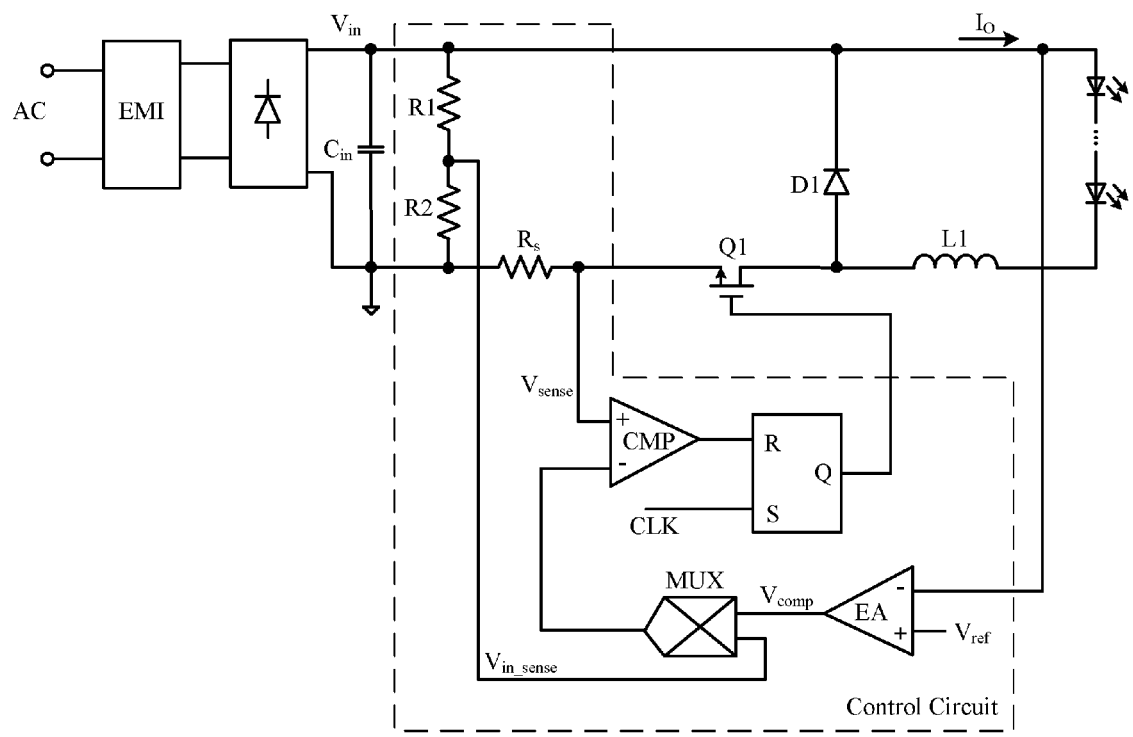
FIG. 2 shows a schematic diagram of another example LED driver.

FIG. 2 shows a schematic diagram of another LED driver. A power stage circuit can include power switch Q1, diode D1, and inductor L1 to receive DC input voltage $V_{in}$, and to generate substantially constant output current $I_o$ to drive an LED load. A control circuit can include a current sampling circuit, an input voltage sampling circuit, comparator CMP, and an RS flip-flop. The working principle of the control circuit is that the input voltage sampling circuit (e.g., including resistors R1 and R2) can sample DC input voltage $V_{in}$ to obtain input voltage sampling signal $V_{in\_sense}$.

The current sampling circuit can connect with power switch Q1 to obtain sampling voltage $V_{sense}$ by sampling the current of power switch Q1. The comparison result obtained by taking input voltage sampling signal $V_{in\_sense}$ as a reference signal to compare against sampling voltage $V_{sense}$ can be used to turn on or off power switch Q1 via the RS flip-flop, so as to control the driving current of the LED load and to realize power factor correction. However, by adopting this implementation, the control precision of the output current may not be high since the current of power switch Q1 is sampled rather than the load current. In addition, the power factor correction of this particular LED driver may not suffice to achieve a high enough power factor for certain applications.

In particular embodiments, an inductor current detection circuit can detect an ending time of inductor current under discontinuous conduction mode by precisely sampling and holding an induced voltage. The induced voltage can represent or express the inductor current, so that the inductor current holding time can be precisely attained. Also in particular embodiments, an LED driver can calculate an average value of the inductor current by using the inductor current detection circuit. Current control precision can be improved by utilising the output current information of the LED driver.

In addition, quasi-resonant driving for the power switch can be achieved by accurate detection of the ending time of the inductor current. This can decrease switching losses and improve working efficiency. Also, by controlling the inductor current, power factor correction can be achieved to obtain a higher power factor, and requirements for the EMI suppression circuit can be lowered. Further, volume and weight of the power supply can be decreased accordingly. The high power factor, high efficiency LED driver in particular embodiments can meet electro-magnetic compatibility (EMC) standards, and a series of other requirements, such as high current control precision, high reliability, small volume, and low cost.

In one embodiment, an inductor current detection circuit configured in a switching mode power supply under discontinuous conduction mode, can include: (i) a voltage detection circuit configured to generate a sampling voltage based on a drain-source voltage of a power switch in the switching mode power supply; (ii) a voltage holding circuit configured to receive the sampling voltage, and to generate a holding voltage through a sampling and holding operation; and (iii) a comparison circuit configured to compare the sampling voltage against the holding voltage, and to generate a zero-crossing signal when the sampling voltage is less than the holding voltage, where the zero-crossing signal is configured to represent an inductor current ending time of the switching mode power supply.

Figure 3A:
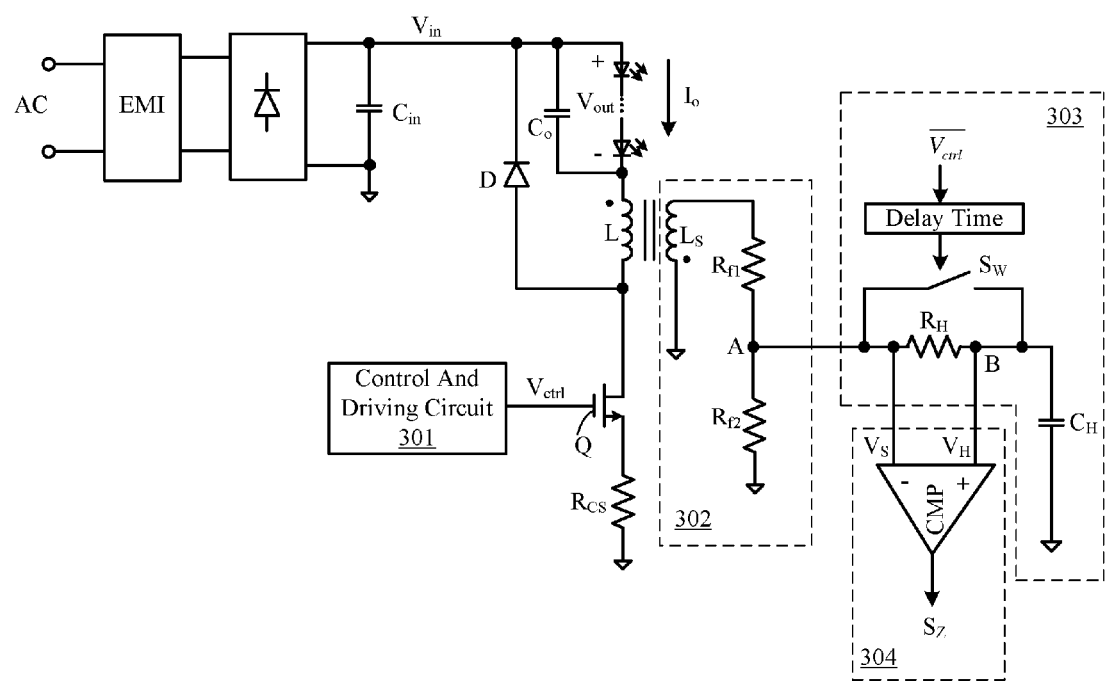
FIG. 3A shows a block schematic diagram of an example inductor current detection circuit in accordance with embodiments of the present invention.

FIG. 3A shows a schematic diagram of an example inductor current detection circuit in accordance with embodiments of the present invention. In this particular example, the inductor current detection circuit can be applied in a buck LED driver to detect an ending time of an inductor current. For example, the buck LED driver can operate in a discontinuous conduction mode (e.g., DCM inductor current discontinuous conduction mode).

In this example, the inductor current detection circuit can include voltage detection circuit 302, voltage holding circuit 303, and comparison circuit 304. Voltage detection circuit 302 can be coupled with inductor L of the buck LED driver to generate an induced voltage based on the current of the inductor. Sampling voltage $V_s$ can be obtained by dividing (e.g., via a resistor divider circuit) the induced voltage. Thus, the induced voltage can be used to express or represent the drain-source voltage of power switch Q.

Voltage holding circuit 303 can connect with voltage detection circuit 302, and may be used to receive sampling voltage $V_s$ and to generate a holding voltage $V_H$ by sampling and holding sampling voltage $V_s$. Comparison circuit 304 can connect to voltage detection circuit 302 and voltage holding circuit 303, and may be used to receive and compare sampling voltage $V_S$ and holding voltage $V_H$. For example, when sampling voltage $V_S$ is less than holding voltage $V_H$, zero-crossing signal $S_Z$ can be generated. Further, zero-crossing signal $S_Z$ can express or represent an ending time (e.g., when inductor reaches zero) of inductor current.

Figure 3B:
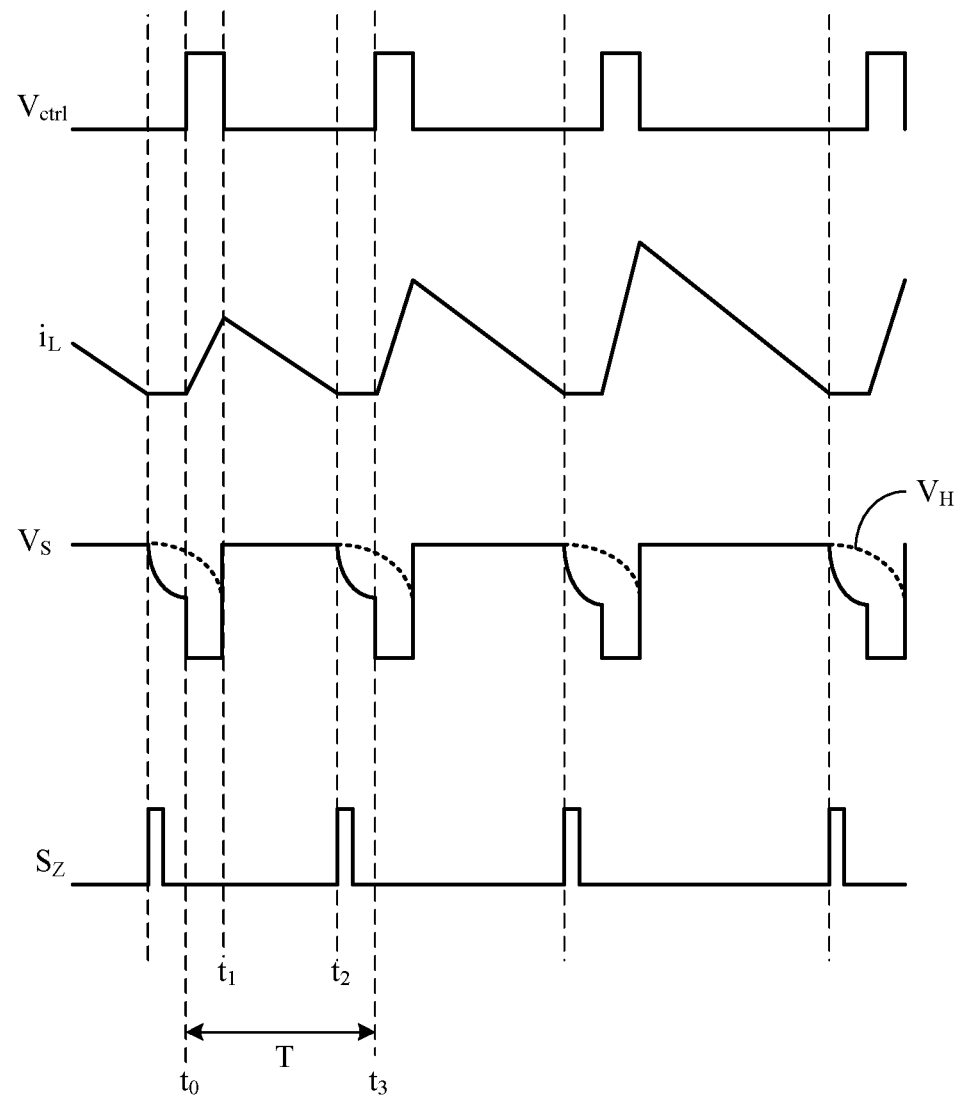
FIG. 3B shows an example operation waveform diagram of the inductor current detection circuit shown in FIG. 3A.

Referring now to an example operation waveform diagram of the inductor current detection circuit of FIG. 3A in FIG. 3B, working principles of the inductor current detection circuit of particular embodiments can be introduced below. In a switching period T (e.g., from time $t_0$ to time $t_3$), during an active period (e.g., from time $t_0$ to time $t_1$) of control signal $V_{ctrl}$, inductor current $i_L$ can rise from zero to an inductor current peak value. During an inactive period (e.g., from time $t_1$ to time $t_3$) of control signal $V_{ctrl}$, inductor current $i_L$ can decrease from the inductor current peak value to zero until time $t_2$. After the inductor current is reduced to zero, resonance between inductor L and the parasitic capacitor of power switch Q may increase, so sampling voltage $V_S$ may begin to decrease at time $t_2$.

By holding sampling voltage $V_s$ through voltage holding circuit 303, the rate of decline of holding voltage $V_H$ can be less than that of sampling voltage $V_S$. Comparison circuit 304 can be used to compare sampling voltage $V_s$ against holding voltage $V_H$. During a time interval form time $t_1$ to time $t_2$, when the inductor current is not zero, sampling voltage $V_S$ can be equal to holding voltage $V_H$. When inductor current $i_L$ drops to zero at time $t_2$, sampling voltage $V_S$ can be less than holding voltage $V_H$. The start time when sampling voltage $V_S$ is less than holding voltage $V_H$ can be configured as the ending time of inductor current $i_L$. Therefore, zero-crossing signal $S_Z$ can be generated by comparison circuit 304 at time $t_2$.

In the particular example shown in FIG. 3A, specific implementations of voltage detection circuit 302, voltage holding circuit 303, and comparison circuit 304 are shown. However, those skilled in the art will recognize that other circuit structures can also be utilized in certain embodiments. In this particular example, voltage detection circuit 302 can include auxiliary inductor $L_S$ and a dividing resistor network. Auxiliary inductor $L_S$ can couple with inductor L of the LED driver, and may generate an induced voltage according to the inductor current.

Resistor $R_{f1}$ and resistor $R_{f2}$ connected in series between two terminals of auxiliary inductor $L_S$ can form the dividing resistor network to divide the induced voltage of auxiliary inductor $L_S$ to generate sampling voltage $V_S$ at common node A of resistor $R_{f1}$ and $R_{f2}$ for expressing the inductor current. In this particular example, the induced voltage that represents the current of inductor L in the LED driver can be in the same phase with the drain-source voltage of power switch Q. However, the voltage detection circuit can be not limited to the very particular implementation shown above. Other suitable voltage detection circuitry can also be used in the inductor current detection circuit of particular embodiments. For example, the drain-source voltage of the power switch may be directly sampled in some cases.

Voltage holding circuit 303 can include resistor $R_H$ and capacitor $C_H$ connected between common node A and ground, and switch $S_W$ which can connect in parallel with resistor $R_H$. The switching stage of switch $S_W$ can be controlled by an inverted version of control signal $V_{ctrl}$. When control signal $V_{ctrl}$ goes inactive, switch $S_W$ is turned on, and holding voltage $V_H$ can rapidly follow sampling voltage $V_S$. After a predetermined holding time (e.g., about 2 us), switch $S_W$ can be turned off, and holding voltage $V_H$ can be held through resistor $R_H$ and capacitor $C_H$.

Before the inductor current reaches zero (e.g., before time $t_2$), sampling voltage $V_S$ can be maintained as substantially constant, and holding voltage $V_H$ can be almost the same as sampling voltage $V_S$. After the inductor current reaches zero (e.g., after time $t_2$), sampling voltage $V_S$ may begin to decline due to resonance. Because of the holding function of capacitor $C_H$, the voltage at common node B of resistor $R_H$ and capacitor $C_H$ (holding voltage $V_H$) may decline relatively slowly with a rate of decline that is less than that of sampling voltage $V_S$. Thus, holding voltage $V_H$ can be higher than sampling voltage $V_S$.

Comparison circuit 304 can include comparator CMP that has a non-inverting input terminal to receive holding voltage $V_H$, and an inverting input terminal to receive sampling voltage $V_S$. When holding voltage $V_H$ is greater than sampling voltage $V_S$, the output signal of the comparator can change to generate zero-crossing signal $S_Z$ (e.g., as a one-shot pulse), so that the ending time of the inductor current can be precisely detected.

Other alternative implementations for the comparison of holding voltage $V_H$ and sampling voltage $V_S$ can also be supported in particular embodiments. For example, when sampling voltage $V_S$ is less than holding voltage $V_H$ and the difference between them is greater than a threshold value, zero-crossing signal $S_Z$ can be generated to represent the ending time of the inductor current. In this case, comparison circuit 304 can be implemented as a hysteresis comparator. Also, the threshold value can be the hysteresis width of the hysteresis comparator.

By adopting the inductor current detection circuit of certain embodiments, the ending time of the inductor current can be precisely detected. Therefore, the inductor current detection circuit can be widely used in isolated or non-isolated (e.g., flyback converter) topologies. Based on detecting the ending time of the inductor current precisely, various advantageous aspects can be provided for the implementation of the control circuit. For example, the output current can be obtained precisely to provide convenience for precise current control.

Particular embodiments also support a high efficiency and high power factor LED driver with an inductor current detection circuit. In one embodiment, an LED driver can include: (i) an inductor current detection circuit; (ii) a control circuit configured to receive the zero-crossing signal, and to generate a control signal configured to control a switching operation of the power switch; (iii) where the control signal is configured to control the power switch to turn on in a switching period after a delay time of the zero-crossing signal; and (iv) where the control signal is configured to control the power switch to turn off after a conduction time interval after the power switch is turned on, where the conduction time interval is proportional to an error between a present output current of the LED driver and an expected output current.

Figure 4A:
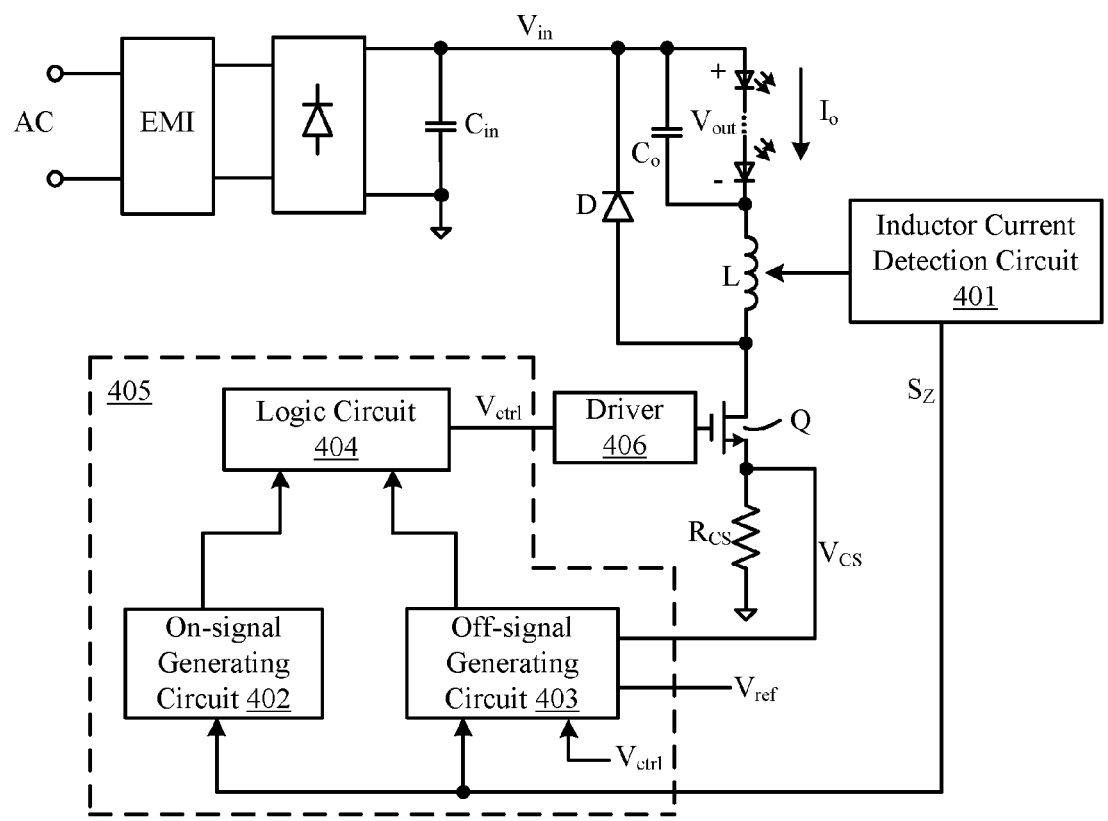
FIG. 4A shows a block schematic diagram of an example LED driver in accordance with embodiments of the present invention.

Referring now to FIG. 4A, shown is a block schematic diagram of an example LED driver in accordance with embodiments of the present invention. In this particular example, the LED driver can include a power stage circuit, inductor current detection circuit 401, control circuit 405, and driver 406. The power stage circuit can include power switch Q, diode D, output capacitor C, and inductor L to receive, e.g., half sine wave DC input voltage $V_{in}$, and to generate DC output voltage $V_{out}$ and output current $I_o$ to drive the LED load. Inductor current detection circuit 401 can be any suitable type of inductor current detection circuit to generate zero-crossing signal $S_Z$ as shown in FIGS. 3A and 3B. Control circuit 405 can receive zero-crossing signal $S_Z$ to generate corresponding control signal $V_{ctrl}$, so as to control a switching operation of power switch Q of the power stage circuit.

In a given switching period, after a delay time (e.g., a predetermined delay after a rising or a falling edge) of zero-crossing signal $S_Z$, control signal $V_{ctrl}$ can control power switch Q to turn on. This operation can realize quasi-resonant driving for power switch Q. After conduction time interval $t_{on}$ of power switch Q, control signal $V_{ctrl}$ can control power switch Q to turn off. For example, conduction time interval $t_{on}$ can be proportional to an error between the present output current and an expected output current of the LED driver.

Figure 4B:
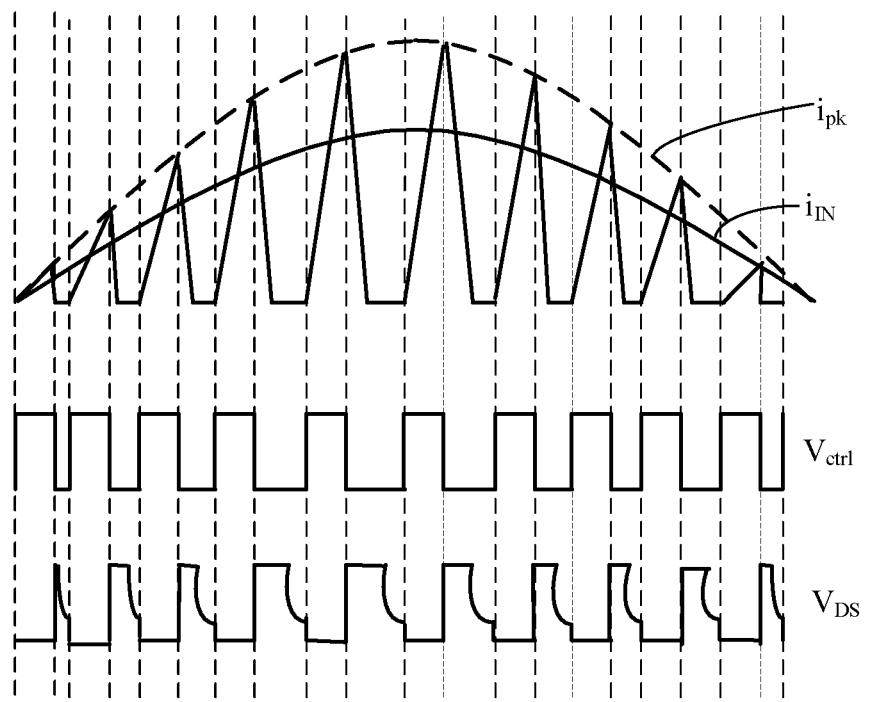
FIG. 4B shows an example operation waveform diagram of the LED driver shown in FIG. 4A.

Driver 406 can generate a corresponding driving signal according to control signal $V_{ctrl}$, to drive the switching operation of power switch Q to maintain the output current as substantially constant. In addition, the input current can be maintained in the same phase with half sine wave DC input voltage $V_{in}$. FIG. 4B shows an example operation waveform diagram of the LED driver shown in FIG. 4A. Inductor current $i_L$ can be discontinuous, and the inductor current peak can be expressed as an Equation 1 below.

$$i_{pk} = \frac{(V_{in} - V_{out})}{L} \times t_{on} \qquad (1)$$

As conduction time interval $t_{on}$, output voltage $V_{out}$, and inductor L are substantially constant, inductor current peak $i_{pk}$ can be proportional to half sine wave input voltage $V_{in}$ and the inductor current peak envelope can be in a sinusoidal shape as shown. In this way, input current $i_{IN}$ can be proportional to half sine wave input voltage $V_{in}$ and the LED driver in this particular example can achieve a relatively high power factor.

Also, in the particular LED driver example shown in FIG. 4A, a specific implementation of control circuit 405 provided can include on-signal generating circuit 402, off-signal generating circuit 403, and logic circuit 404. On-signal generating circuit 402 can receive zero-crossing signal $S_Z$ to generate an on-signal after a predetermined delay time, in order to achieve quasi-resonant driving for power switch Q. For example, the delay time can be set (e.g., programmed by a user) according to various applications or factors (e.g., product test or characterization).

Off-signal generating circuit 403 can receive zero-crossing signal $S_Z$, detection voltage $V_{CS}$ that represents inductor current $i_L$, control signal $V_{ctrl}$, and reference voltage source $V_{ref}$ that represents an expected output current. Off-signal generating circuit 403 can generate conduction time interval $t_{on}$ to represent an error between the present output current and the expected output current of the LED driver. Thus, the off-signal can be generated at the ending time of the conduction time interval to control power switch Q of the power stage circuit to turn off. In this way, constant conduction time control of power switch Q can be achieved.

Inductor current $i_L$ can be obtained by detection resistor $R_{CS}$ which can connect in series with power switch Q. When power switch Q is on, detection voltage $V_{CS}$ at the common node of detection resistor $R_{CS}$ and power switch Q can express the current of power switch Q (inductor current $i_L$). Logic circuit 404 can connect with on-signal generating circuit 402 and off-signal generating circuit 403 to receive an on-signal and an off-signal, such that control signal $V_{ctrl}$ can be generated.

Figure 5:
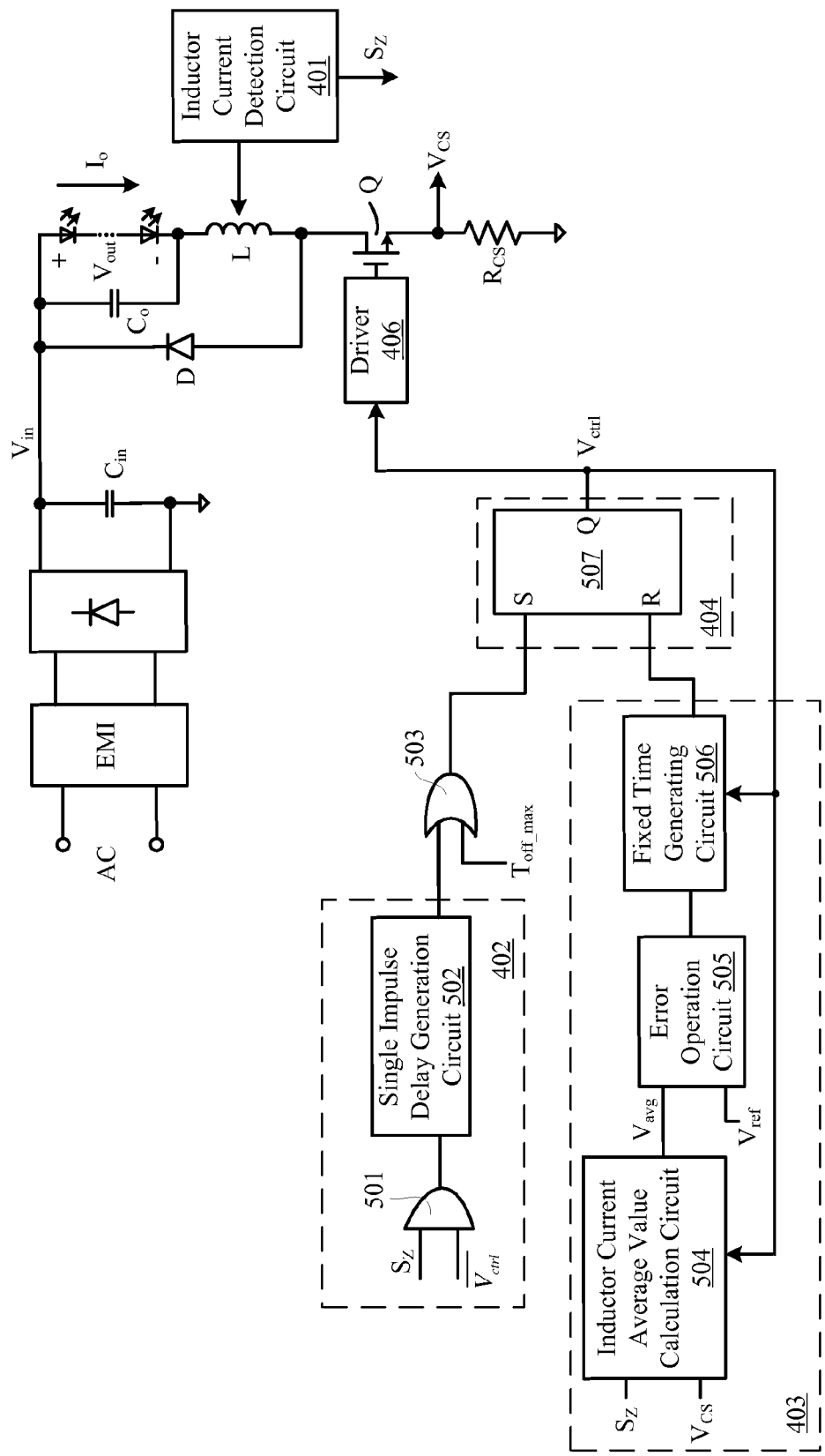
FIG. 5 shows a block schematic diagram of another example LED driver in accordance with embodiments of the present invention.

Referring now to FIG. 5, shown is a block schematic diagram of another LED driver in accordance with embodiments of the present invention. In this particular example, example implementations of on-signal generating circuit 402, off-signal generating circuit 403, and logic circuit 404 are shown. On-signal generating circuit 402 can include AND-gate 501 and single impulse delay time generating circuit 502. AND-gate 501 can receive zero-crossing signal $S_Z$ and an inverted version of control signal $V_{ctrl}$. When both of zero-crossing signal $S_Z$ and the inverted version of control signal $V_{ctrl}$ are active, the output signal of AND-gate 501 may trigger single impulse delay time generating circuit 502. After a certain predetermined delay time, the on-signal can be generated.

In order to regulate the output electric signal under small load applications, and avoid inadvertently having power switch Q off, OR-gate 503 can be used to receive max off-time $T_{off\_max}$ of power switch Q, and the output signal of single impulse delay time generating circuit 502. When sampling voltage $V_S$ reaches a localized low or valley value, or the off-time of power switch Q reaches the maximum off-time $T_{off\_max}$, the on-signal can be output via OR-gate 503. Off-signal generating circuit 403 can include inductor current average value calculation circuit 504, error operation circuit 505, and fixed time generating circuit 506. For example, inductor current average value calculation circuit 504 can receive zero-crossing signal $S_Z$, control signal $V_{ctrl}$, and detection signal $V_{CS}$, to generate average voltage $V_{avg}$. Average voltage $V_{avg}$ can express the average value of the present inductor current or the present output current of the LED driver.

Error operation circuit 505 can receive average voltage $V_{avg}$ and reference voltage source $V_{ref}$ that represents the expected output current, to obtain an error signal. Fixed time generating circuit 506 can generate conduction time interval $t_{on}$ according to the error signal after turning on power switch Q. After power switch Q is turned on for conduction time interval $t_{on}$, power switch Q can be turned off. In this way, the output current can be maintained as substantially constant through a closed loop and can also ensure that the input current in phase with the half sine input voltage. Logic circuit 404 can include RS flip-flop 507 having a set terminal S to receive the on-signal, and a reset terminal R to receive the off-signal. The output signal of RS flip-flop 507 can be configured as control signal $V_{ctrl}$.

Figure 6:
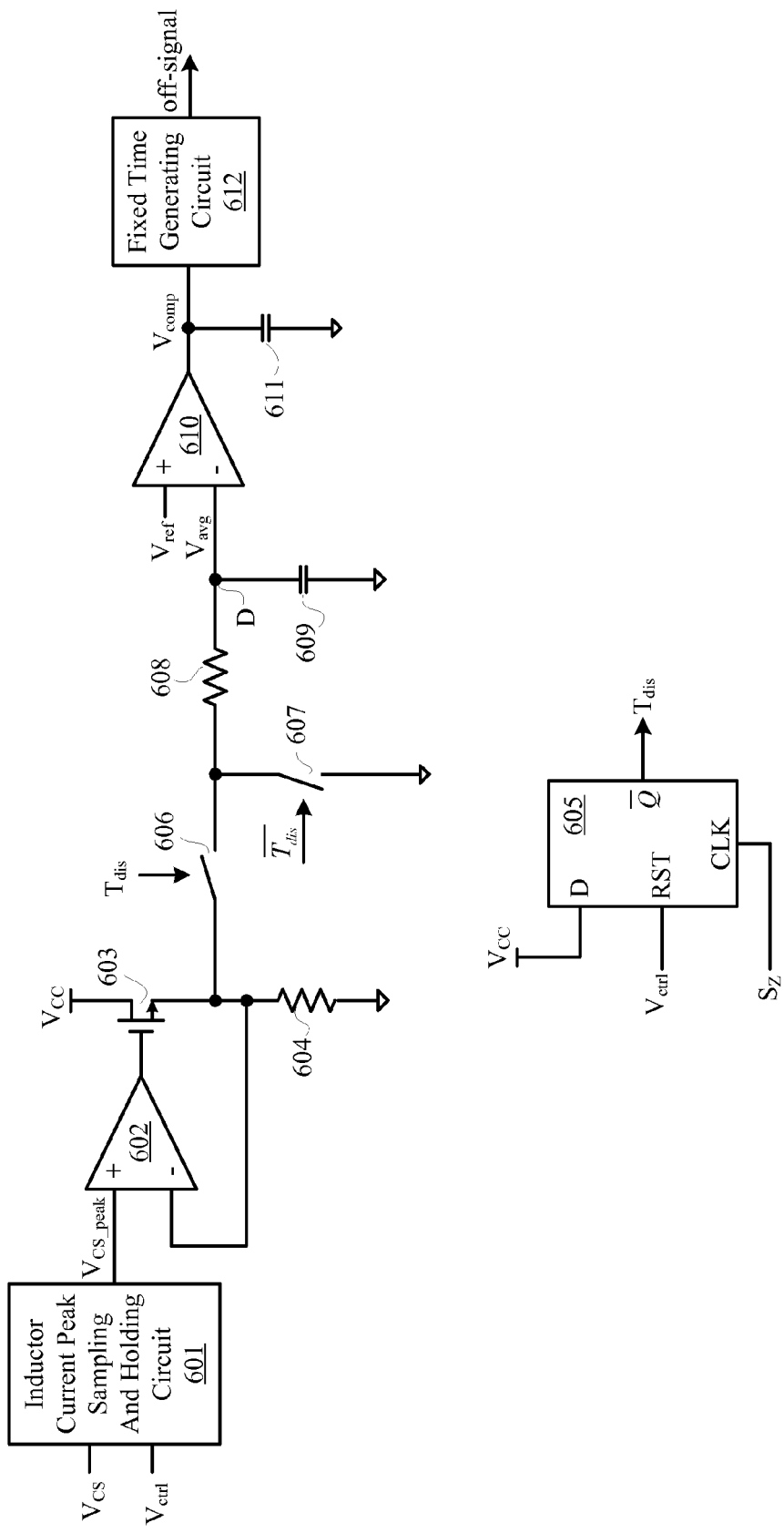
FIG. 6 shows a block schematic diagram of an example off-signal generating circuit in accordance with present invention embodiment.

Various implementations of on-signal generating circuit 402, logic circuit 404, and off-signal generating circuit 403 can be supported in particular embodiments. For example, FIG. 6 shows a block diagram of an example off-signal generating circuit in accordance with embodiments of the present invention. In this particular example, off-signal generating circuit 403 can include an inductor current average value calculation circuit, error operation circuit 610, and fixed time generating circuit 612. The inductor current average value calculation circuit can include inductor current peak value sampling and holding circuit 601, an inductor current holding time generating circuit, and a peak-average conversion circuit. Inductor current peak sampling and holding circuit 601 can receive sampling voltage $V_{CS}$ that represents the inductor current, and control signal $V_{ctrl}$, to generate peak value detection voltage $V_{CS\_peak}$ to express the inductor current peak value.

The inductor current holding time generating circuit can include D-type flip-flop 605 receiving control signal $V_{ctrl}$ and zero-crossing signal $S_Z$, and providing inductor current holding time $T_{dis}$. Inductor current holding time $T_{dis}$ may start from a beginning time of control signal $V_{ctrl}$ and go to an ending time of zero-crossing signal $S_Z$. The peak-average conversion circuit can include a buffer circuit, a chopper circuit, and a filter circuit, to receive peak value detection voltage $V_{CS\_peak}$ and inductor current holding time $T_{dis}$, to obtain average voltage $V_{avg}$ expressing an average value of the inductor current.

When control signal $V_{ctrl}$ is active, detection voltage $V_{CS}$ can be used to generate peak value detection voltage $V_{CS\_peak}$ through inductor current peak sampling and holding circuit 601. The buffer circuit that includes amplifier 602, resistor 604, and transistor 603 can be configured as a unity-gain buffer. Peak value detection voltage $V_{CS\_peak}$ can connect to the non-inverting input terminal of comparator 602, and the output terminal of comparator 602 can connect to the control terminal of switch 603 (e.g., N-type transistor). Resistor 604 can connect between the second power terminal of switch 603 and ground. The common node of resistor 604 and transistor 603 can connect to the inverting input terminal of comparator 602.

Reset terminal RST of D-type flip-flop 605 can receive control signal $V_{ctrl}$, and clock terminal CLK can receive zero-crossing signal $S_Z$. The active-state interval of inductor current holding time $T_{dis}$ generated at the output terminal (e.g., from time $t_0$ to time $t_2$ in FIG. 3B) can be configured as the inductor current holding time. Switches 606 and 607 can connect in series between a common node of resistor 604 and switch 603, and ground, so as to form the chopper circuit. Inductor current holding signal $T_{dis}$ can control the switching state of switch 606. The inverted signal of inductor current holding signal $T_{dis}$ can control a switching state of switch 607.

After the chopping operation of switches 606 and 607, and the filter operation of resistor 608 and capacitor 609, average voltage $V_{avg}$ representing the average value of the inductor current can be obtained at common node D of resistor 608 and capacitor 609. Also, error operation circuit 610 have a non-inverting input terminal coupled to average voltage $V_{avg}$, and an inverting input terminal to receive reference voltage source $V_{ref}$, so as to generate an error signal at its output terminal. After being compensated by capacitor 611, compensation signal $V_{comp}$ can be obtained based on the error signal. Fixed time generating circuit 612 can receive compensation signal $V_{comp}$ to generate a signal with a time interval as an off-signal. People skilled in the art will recognize that fixed time generating circuit 612 can be implemented via any suitable type of existing technologies or modifications, including analog and/or digital circuitry.

In this way, an inductor current detection circuit in accordance with embodiments of the present invention can precisely obtain an ending time of inductor current, and can also be used in other suitable types of switching mode power supplies (e.g., an LED driver).

The foregoing descriptions of specific embodiments of the present invention have been presented through images and text for purpose of illustration and description of the start-up circuit and method. They are not intended to be exhaustive or to limit the invention to the precise forms disclosed, and obviously many modifications and variations are possible in light of the above teaching, such as the variable number of the current mirror and the alternatives of the type of the power switch for different applications.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. An inductor current detection circuit configured in a switching mode power supply under discontinuous conduction mode, the inductor current detection circuit comprising:
   a) a voltage detection circuit coupled to a secondary winding of a transformer of said switching mode power supply and configured to generate a sampling voltage based on a drain-source voltage of a power switch in said switching mode power supply;
   b) a voltage holding circuit configured to receive said sampling voltage, and to generate a holding voltage through a sampling and holding operation; and
   c) a comparison circuit coupled to an input and an output of said voltage holding circuit and configured to compare said sampling voltage against said holding voltage, and to generate a zero-crossing signal when said sampling voltage is less than said holding voltage, wherein said zero-crossing signal is configured to represent an inductor current ending time of said switching mode power supply.

2. The inductor current detection circuit of claim 1, wherein said voltage detection circuit comprises an auxiliary inductor coupled with an inductor of said switching mode power supply, wherein said auxiliary inductor is configured to generate said sampling voltage as an induced voltage.

3. The inductor current detection circuit of claim 1, wherein said voltage holding circuit comprises:
   a) a resistor and a capacitor coupled in series between said sampling voltage and ground; and
   b) a switch coupled in parallel with said resistor, wherein said power switch is turned from off to on to generate said holding voltage at a common node of said resistor and said capacitor.

4. The inductor current detection circuit of claim 1, wherein said comparison circuit comprises a comparator having a non-inverting terminal configured to receive said holding voltage, an inverting input terminal configured to receive said sampling voltage, and an output terminal configured to provide said zero-crossing signal.

5. A light-emitting diode (LED) driver, comprising:
   a) the inductor current detection circuit of claim 1;
   b) a control circuit configured to receive said zero-crossing signal, and to generate a control signal configured to control a switching operation of said power switch;
   c) wherein said control signal is configured to control said power switch to turn on in a switching period after a delay time of said zero-crossing signal; and
   d) wherein said control signal is configured to control said power switch to turn off after a conduction time interval after said power switch is turned on, wherein said conduction time interval is proportional to an error between a present output current of said LED driver and an expected output current.

6. The LED driver of claim 5, wherein said control circuit comprises:
   a) an on-signal generating circuit configured to receive said zero-crossing signal, and to generate an on-signal after said delay time;
   b) an off-signal generating circuit configured to receive said zero-crossing signal, a detection signal that represents said inductor current, said control signal, and a reference voltage that represents said expected output current, and to generate said conduction time interval and an off-signal in response to said conduction time interval elapsing; and
   c) a logic circuit configured to receive said on-signal and off-signal, and to generate said control signal.

7. The LED driver of claim 6, wherein said off-signal generating circuit comprises:
   a) an inductor current average value calculation circuit configured to receive said zero-crossing signal, said control signal, and said detection signal, and to generate an average voltage that represents an average value of said inductor current;
   b) an error operation circuit configured to receive said reference current source and said average voltage, and to generate an error signal; and
   c) a fixed time generating circuit configured to receive said error signal, and to generate said conduction time interval.

8. The LED driver of claim 7, wherein said inductor current average value calculation circuit comprises:
   a) an inductor current peak sampling and holding circuit configured to detect said inductor current, and to generate a peak detection voltage that represents said inductor current peak value;
   b) an inductor current holding time generating circuit configured to receive said control signal and said zero-crossing signal, and to generate an inductor current holding time, wherein said inductor current holding time lasts from a starting time of said control signal to an ending time of said zero-crossing signal; and
   c) a peak-average conversion circuit configured to receive said peak detection voltage and said inductor current holding time, and to generate said average voltage.

9. The LED driver of claim 8, wherein said inductor current holding time generating circuit comprises a D-type flip-flop having a reset terminal thereof configured to receive said control signal, a clock terminal configured to receive said zero-crossing signal, and an output terminal configured as said inductor current holding time.

10. The LED driver of claim 6, wherein said logic circuit comprises an RS flip-flop having a terminal configured to receive said on-signal, a reset terminal configured to receive said off-signal, and an output terminal configured as said control signal.

* * * * *